United States Patent
Huang et al.

(10) Patent No.: US 7,242,936 B2
(45) Date of Patent: Jul. 10, 2007

(54) MULTI-SLOPE HANDOFF ALGORITHM FOR CONTROLLING DYNAMIC COMMUNICATION QUALITY IN WIRELESS COMMUNICATIONS

(75) Inventors: Ching Yao Huang, Taipei (TW); Ming Yuan Tsai, Su-au Jen (TW); Joe Huang, Parsippany, NJ (US)

(73) Assignee: National Chiao Tung University, Hsinchu (TW)

( * ) Notice: Subject to any disclaimer, the term of this patent is extended or adjusted under 35 U.S.C. 154(b) by 49 days.

(21) Appl. No.: 11/109,802

(22) Filed: Apr. 20, 2005

(65) Prior Publication Data

US 2005/0288018 A1 Dec. 29, 2005

(30) Foreign Application Priority Data

Jun. 29, 2004 (TW) ............................... 93118994 A

(51) Int. Cl.
*H04Q 7/20* (2006.01)
(52) U.S. Cl. .................. 455/436; 455/442; 455/440; 455/441; 455/437; 455/438
(58) Field of Classification Search .............. 455/436, 455/440–442, 437–438
See application file for complete search history.

(56) References Cited

U.S. PATENT DOCUMENTS 5,754,493 A * 5/1998 Al-Chalabi .................. 367/38
6,144,861 A * 11/2000 Sundelin et al. ............. 455/522
6,594,243 B1 * 7/2003 Huang et al. ................. 370/332
RE39,177 E * 7/2006 Padovani et al. ............. 455/442
2005/0096049 A1 * 5/2005 Burch et al. ................. 455/436
2006/0053223 A1 * 3/2006 Tucker et al. ................ 709/227
2006/0187869 A1 * 8/2006 Czaja et al. .................. 370/320

* cited by examiner

*Primary Examiner*—Duc M. Nguyen
*Assistant Examiner*—Eric J Elcenko
(74) *Attorney, Agent, or Firm*—Rosenberg, Klein & Lee

(57) ABSTRACT

A multi-slope handoff algorithm for controlling dynamic communication quality in wireless communications is proposed to let a mobile node adjust the handoff slope according to different communication connection situations for setting the optimum add/drop connection trigger thresholds. The algorithm comprises the following steps. First, a mobile node receives pilot strengths of its service pilot and nearby pilots to produce an aggregate strength. Next, the mobile node determines whether to perform handoff according to the magnitude of the aggregate strength. The handoff action is then controlled by multi-slope handoff operations to set an appropriate slope and to calculate the add/drop connection trigger thresholds when performing handoff. Finally, the pilot to be connected is selected based on the communication quality at that time. In this way, the quality of the communication service can be enhanced, the connection power consumption can be lowered, and the communication channel usage can be reduced.

19 Claims, 5 Drawing Sheets

MULTI-SLOPE HANDOFF ALGORITHM FOR CONTROLLING DYNAMIC COMMUNICATION QUALITY IN WIRELESS COMMUNICATIONS

FIELD OF THE INVENTION

The present invention relates to a network handoff technique and, more particularly, to a multi-slope handoff algorithm for controlling dynamic communication quality in wireless communications.

BACKGROUND OF THE INVENTION

In all wireless communication systems, the motion of a user will cause the handoff of the associated communication connection. How to effectively design the communication handoff technique concerns whether the communication handoff is successful and effective distribution of resources of the communication system.

In a wireless network communication system, when a mobile node (MN) performs mobile communication in the system and enters from a cell into another cell, there will be a cell handoff. The handoff can be generally divided into a hard handoff and soft handoff. In the hard handoff, the MN only connects to a base station from start to end of the handoff. The communication quality in the handoff process can't be guaranteed. On the other hand, in the soft handoff, the MN keeps contact with several base stations simultaneously and selects the strongest signal for communication. Although the communication quality during handoff is better, the required system resources are more than that in the hard handoff.

In the first conventional handoff algorithm-signal strength handoff (SSHO), base stations only detect the signal strength of MN for the handoff. Because factors like loading and stability of the communication system aren't taken into account, once a base station adds a new MN into its range, instability of fading channel will cause instability of the communication quality.

A second conventional handoff algorithm-IS95A belongs to code division multiple access handoff techniques, as shown in FIG. 1. This algorithm compares the pilot strength of a nearby base station in a neighbor list table with a fixed communication handoff add threshold to determine whether to handoff to the nearby base station. Contrarily, if the pilot strength of a service base station is lower than a fixed communication handoff drop threshold for a fixed duration, the service base station will be removed from the neighbor list table and its data communication connection. Under different communication connection qualities, however, the same communication handoff thresholds are used as the handoff trigger control mechanism. Therefore, the actual communication connection quality and the required system resources can't be effectively detected and controlled.

A third conventional handoff algorithm makes use of behavior aggregate handoff (BAHO) technique, usually the IS-95B/cdma2000 technique. An aggregate Ec/Io strength is used to set trigger thresholds. When a MN handoffs from an original service base station to a nearby base station, the MN will perform dynamic communication quality control as the linear formula shown in FIG. 2. However, because the parameter aggregate Ec/Io strength has different performance behaviors under different number of connection paths, only using the aggregate Ec/Io strength as the parameter without considering factors like downlink interference and stability caused by the loading of the communication system can't effectively maintain the connection quality. The downlink means transmission from a base station to a mobile phone.

In order to avoid an unsuccessful connection, new legs are largely added in. A new leg is added in under a bad communication connection to improve the communication quality strength. Due to the increase of downlink interference, the communication quality can't necessarily be improved. Adding a new leg may improve the connection quality but at the cost of increasing overall system interference. If the communication quality of the new leg is unstable, the improvement to the connection quality is none. In view of this, the present invention proposes a multi-slope handoff algorithm for controlling dynamic communication quality in wireless communications. Only legs with reasonable strengths are added in to produce positive contribution for the final connection quality and conform to the nonlinear relationship between the communication quality and connection channel.

SUMMARY OF THE INVENTION

An objective of the present invention is to provide add/drop connection trigger thresholds setting method of a base station or a Mobile Station according to different connection qualities during communication handoff process to exactly enhance the quality of communication service.

Another objective of the present invention is to provide a multi-slope handoff algorithm to conform to the nonlinear relationship between the quality of the communication connection and the correctness of data reception for enhancing the performance of wireless communication system.

To achieve the above objectives, the present invention provides a multi-slope handoff algorithm for controlling dynamic communication quality in wireless communications, which comprises the following steps. First, a mobile node receives pilot strengths of its servicing pilot and nearby pilots to produce an aggregate strength. Next, the mobile node determines whether to perform the handoff according to the magnitude of the aggregate strength. If the answer is yes, multi-slope handoff operations are performed; otherwise, services provided by the servicing pilot are continually utilized. If the aggregate strength is lower than a set value, the handoff of the servicing pilot is required. Each time when performing multi-slope handoff operations, a slope in the handoff operation is readjusted according to different communication connection situations. The new slope and the aggregate strength are used to calculate add/drop connection trigger thresholds. Finally, the pilot to be connected is selected based on the communication quality at that time.

The various objectives and advantages of the present invention will be more readily understood from the following detailed description in conjunction with the appended drawing, in which:

DETAILED DESCRIPTION OF THE PREFERRED EMBODIMENTS

The present invention is used for controlling of dynamic communication connection quality between mobile nodes like mobile phones and pilots like base stations. By using communication connection qualities as parameters for handoff calculations, the slope is readjusted according to different communication connection situations for setting of add/drop connection trigger thresholds of a base station or a mobile system, thereby considering both the communication strength and the stability.

Figure 1:
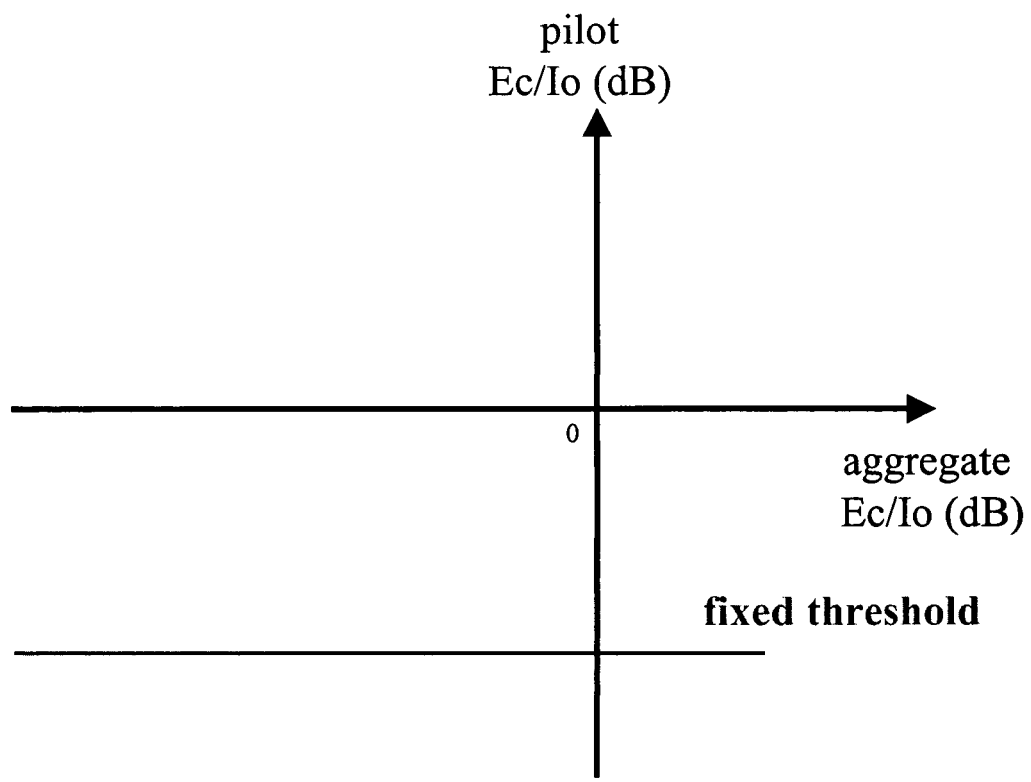
FIG. 1 is a diagram illustrating a linear relationship of a conventional handoff algorithm.
Figure 2:
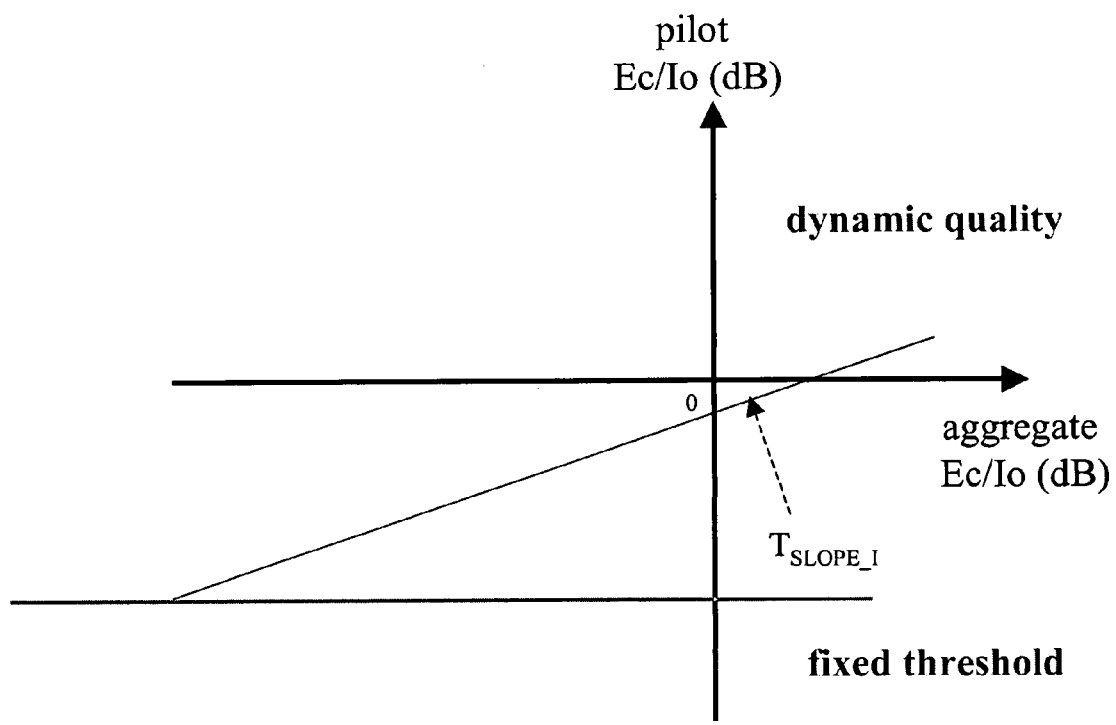
FIG. 2 is a diagram illustrating a linear relationship of another conventional handoff algorithm.
Figure 3:
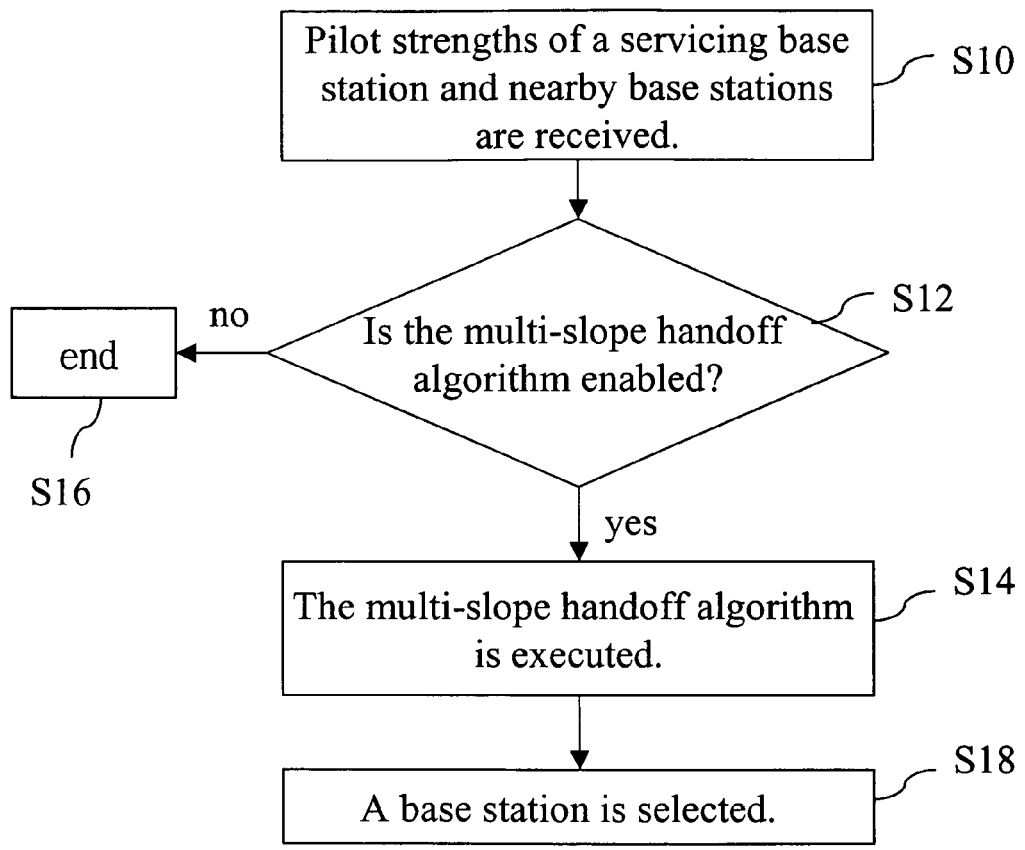
FIG. 3 is a flowchart of a multi-slope handoff algorithm of a wireless communication according to an embodiment of the present invention.

FIG. 3 is a flowchart of a multi-slope handoff algorithm of the present invention. The multi-slope handoff algorithm comprises the following steps. First, a mobile node receives pilot strengths of a servicing base station and nearby base stations to produce an aggregate strength (briefly termed agg Ec/Io) (Step S10). Next, whether to perform the handoff to a new base station is determined based on the magnitude of the aggregate strength agg Ec/Io (Step S12). If the magnitude is too weak, multi-slope handoff operations are performed (Step S14), and Step S18 for the selection of the base station is then proceeded; otherwise, services provided by the servicing base station are continued, and the process is ended (Step S16).

In the steps from S12 to S18, if the value of agg Ec/Io is below a set threshold, handoff of base station is required, i.e., Step S14 is proceeded for adding a base station with a stronger signal. The handoff formula used by the present invention is for setting the add/drop connection trigger thresholds $T_{ADD}/T_{DROP}$ of a base station or a mobile station. The handoff formula is as follows:

$$T_{ADD\_MultiSlope} = A\left(\sum_{i \in \{active\ set\}} (Ec/Io)_i\right) \times \sum_{i \in \{active\ set\}} (Ec/Io)_i + \quad (1)$$

$$B\left(\sum_{i \in \{active\ set\}} (Ec/Io)_i\right)$$

$$T_{ADD} = \max\left\{\min\left[\max_{i \in \{active\ set\}} \{i \mid (Ec/Io)_i\}, T_{ADD\_MultiSlope} + \Delta\right],\right.$$

$$\left. T_{ADD\_95A}\right\}$$

where $\Delta$ represents a hysteresis between $T_{ADD\text{-}MultiSlope}$ and the new pilot Ec/Io. The value of $\Delta$ will change along with the present connected base station. For instance, if there is only a base station for the present connection, the value of $\Delta$ is 3 dB. If the number of leg increases, the value of $\Delta$ will decrease.

$$T_{DROP} = \max \quad (2)$$

$$\left\{A_{DROP}\left(\sum_{i \in \{remainingactiveset\}} (Ec/Io)_i\right) \times \sum_{i \in \{remainingactiveset\}} (Ec/Io)_i + \right.$$

$$\left. B_{DROP}\left(\sum_{i \in \{remainingactiveset\}} (Ec/Io)_i\right),\right.$$

$$\left. T_{DROP\_95A}\right\} \text{ for } T_{TROP} \text{ Second}$$

where A represents the slope, and B represents the intercept.

The add connection trigger threshold $T_{ADD}$ is used to determine whether to add the pilot strength of a nearby base station. The drop connection trigger threshold $T_{DROP}$ is used to determine whether to drop the pilot strength of the servicing base station. Each time when formulas (1) and (2) are used for multi-slope handoff operations, the signal strength in the communication connection is usually used as a parameter for measurement of the communication connection quality. The slope A and the intercept B are readjusted based on different communication connection situations. The new slope A and the new intercept B and the aggregate strength agg Ec/Io are used for calculation of the add/drop connection trigger thresholds $T_{ADD}/T_{DROP}$. A base station to be connected is then selected according to the communication connection quality at that time.

Figure 4:
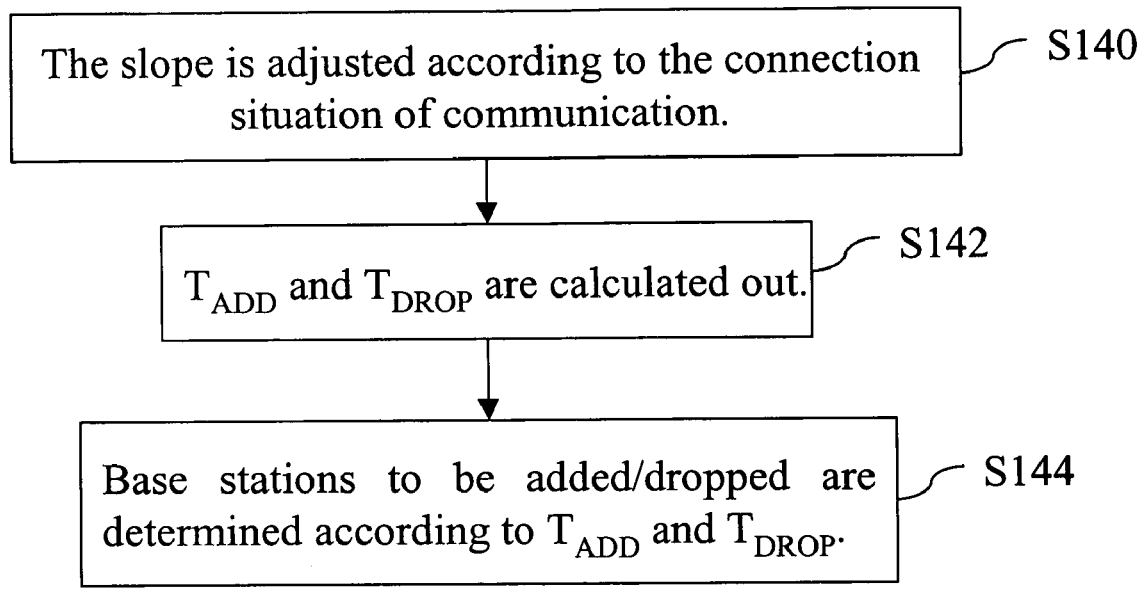
FIG. 4 shows each step in the multi-slope handoff operation procedure of a wireless communication according to an embodiment of the present invention.

Speaking more in detail, as shown in FIG. 4, in Step S14 of performing multi-slope handoff operations, the slope A and the intercept B in formulas (1) and (2) are first readjusted according to the communication connection situation at that time with the communication connection strength as a parameter for measurement of the communication connection quality (Step S140). An add connection trigger threshold $T_{ADD}$ and a drop connection trigger threshold $T_{DROP}$ are then calculated out by using the new slope A, the new intercept B and the aggregate strength agg Ec/Io (Step S142). Next, each pilot strength are compared with the add/drop connection trigger thresholds $T_{ADD}/T_{DROP}$ to determine whether the base stations are to be added/dropped, and Step S18 for selection of base station is then proceeded.

When a mobile node detects the pilot strength of a nearby base station is larger than the add connection trigger threshold $T_{ADD}$, an add connection request is sent to the serving base station. Contrarily, if the mobile node detects the pilot strength of a nearby base station is smaller than the add connection trigger threshold, it is not necessary to add connection of the nearby base station. Besides, when the mobile node detects the pilot strength of the service base station has been smaller than the drop connection trigger threshold $T_{DROP}$ for a preset period of time, a drop connection request is sent to the service base station. Contrarily, if the mobile node detects the pilot strength of the service base station is larger than the drop connection trigger threshold $T_{DROP}$, it is not necessary to drop connection of the service base station. After the base station receives an add/drop connection request from the mobile node, whether to add/drop connection with the mobile node depends on the communication protocol between the base station and the mobile node. The communication protocol is not within the scope of the present invention and thus won't be described below.

Figure 5:
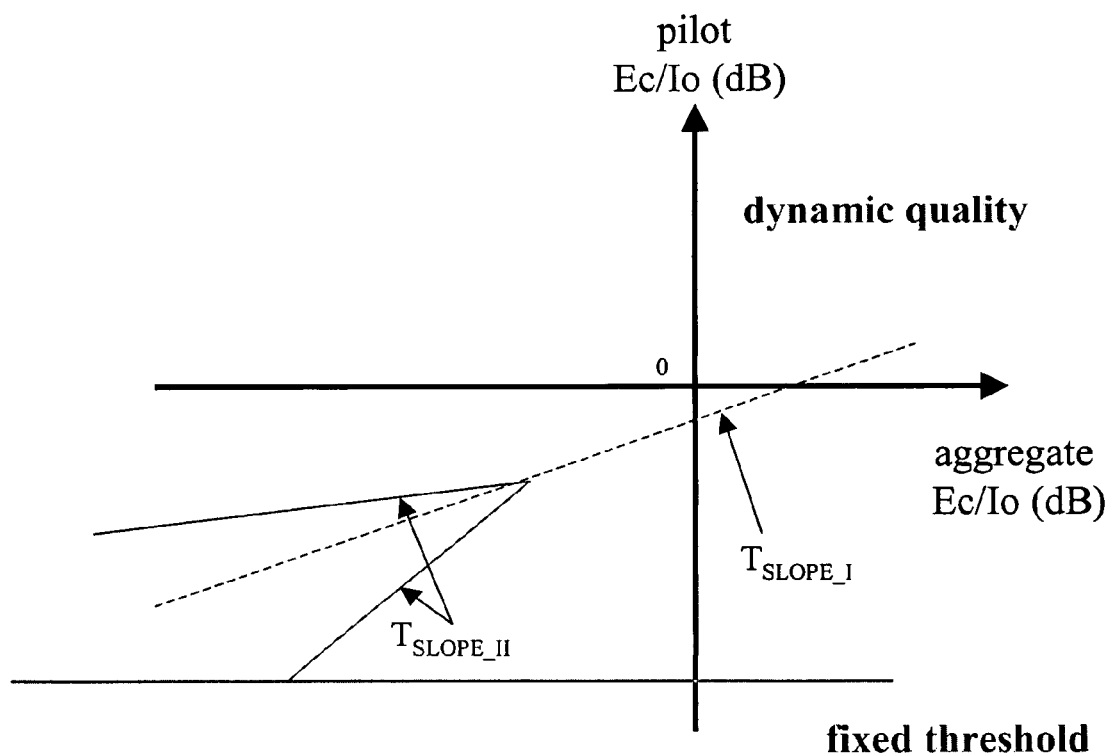
FIG. 5 is a diagram illustrating a nonlinear relationship of a multi-slope handoff algorithm of a wireless communication according to an embodiment of the present invention.

As shown in FIG. 5, two slopes are used for the explanation of the design idea of the present invention. $T_{SLOPE\_I}$ and $T_{SLOPE\_II}$ are used as trigger thresholds of a first slope and a second slope. The value of the second slope can be larger or smaller than the value of the first slope. The relative slopes depend on the transmission environment.

In the theory of the present invention, infinite number of slopes are required to describe a nonlinear curve. Mathematically, formula (1) can be used to express handoff control:

$$T_{ADD\_MultiSlope} = A\left(\sum_{i \in \{active\ set\}} (Ec/Io)_i\right) \times \sum_{i \in \{active\ set\}} (Ec/Io)_i + \quad (1)$$

$$B\left(\sum_{i \in \{active\ set\}} (Ec/Io)_i\right)$$

$$T_{ADD} = \max\left\{\min\left[\max_{i \in \{active\ set\}} \{i \mid (Ec/Io)_i\}, T_{ADD\_MultiSlope} + \Delta\right],\right.$$

$$\left. T_{ADD\_95A}\right\}$$

In formula (1), the slope A is a function of the agg Ec/Io, the intercept B can be adjusted based on an appropriate initial operation point to meet the add leg threshold $T_{ADD\_MultiSlope}$ and $\Delta$ represents a hysteresis between $T_{ADD\_MultiSlope}$ and a new pilot Ec/Io. Besides, for the connection quality, the present invention also takes the status of added new legs in addition to multi-slope. In other words, when performing the selection of a base station, the handoff status of the base station itself is also considered to ensure that its signal strength will be higher that that of the original leg. That is, the signal strength of the added new base station is above a certain quality to have the optimum communication quality in the actual CDMA system. Otherwise, if the handoff frequency of a base station is high, meaning its status is unstable, this base station won't be selected for connection.

The drop connection rule can be expressed as follows:

$$T_{DROP} = \max \quad (2)$$

$$\left\{A_{DROP}\left(\sum_{i \in \{remainingactiveset\}} (Ec/Io)_i\right) \times \sum_{i \in \{remainingactiveset\}} (Ec/Io)_i + \right.$$

$$B_{DROP}\left(\sum_{i \in \{remainingactiveset\}} (Ec/Io)_i\right),$$

$$\left. T_{DROP\_95A}\right\} \text{ for } T_{DROP} \text{ Second}$$

For the add connection trigger threshold $T_{ADD}$ and the drop connection trigger threshold $T_{DROP}$ ($A=A_{DROP}$), it is just reasonable that the two trigger thresholds are calculated based on the same slope. But not limited to the present invention, however, also introduces an offset of the intercept point and a timing hysteresis $T_{TDROP}$ to avoid the ping/pong effect generated in the wireless environment.

The simulation system of the present invention can calculate the pilot strength Ec/Io of each mobile node by means of a propagation model, fading channel, and different loads. In order to grasp dynamic behaviors of radio frequency (RF) state, the number of connection paths, the position of the mobile node, the pilot Ec/Io, the transmission power, and the hardware usage are recalculated every a period of time.

Because the present invention adjusts the handoff slope according to the communication connection situation to set the add/drop connection trigger thresholds $T_{ADD}/T_{DROP}$ of a base station so as to exactly enhance the quality of the communication service, the present invention has the following advantages:

(1) Forward connection power consumption can be effectively reduced.

(2) Because only base stations really assisting in handoff are added, usage of unnecessary base station communication channels can be reduced.

(3) Because only base stations really assisting in handoff are added, the high performance of the wireless communication system can be achieved.

(4) Because both the connection strength and the handoff stability are taken into account, the quality of communication service can be exactly enhanced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

The invention claimed is:

1. A multi-slope handoff method for controlling dynamic communication quality in wireless communications comprising the steps of:
   receiving pilot signals from a service pilot and nearby pilots;
   determining an aggregate strength of said pilot signals; and
   performing handoff operations if said aggregate strength is below a predetermined value or continuing to use of services associated with said service pilot otherwise, said handoff operations including:
   adjusting a slope of a corresponding one of a plurality of line segments in a piecewise linear add threshold function and adjusting a slope of a drop threshold function, said add threshold function and said drop threshold function being functions of said aggregate strength, each said slope being adjusted in accordance with a communication connection quality parameter;
   calculating an add connection trigger threshold and a drop connection trigger threshold from said respective add threshold function and said drop threshold function; and
   selecting a pilot to be connected from a set of pilots including said service pilot, said nearby pilots and pilots added and dropped in accordance with said add connection trigger threshold and said drop connection trigger threshold.

2. The multi-slope handoff method for controlling dynamic communication quality in wireless communications as claimed in claim 1, wherein said pilots are either base stations or mobile nodes.

3. The multi-slope handoff method for controlling dynamic communication quality in wireless communications as claimed in claim 1, wherein the communication connection quality parameter is communication connection strength.

4. The multi-slope handoff method for controlling dynamic communication quality in wireless communications as claimed in claim 1, wherein said add threshold function and said drop threshold function are given by:

$$T_{\text{ADD\_MultiSlope}} =$$

$$A\left(\sum_{i\in\{active\ set\}}(Ec/Io)_i\right)\times\sum_{i\in\{active\ set\}}(Ec/Io)_i + B\left(\sum_{i\in\{active\ set\}}(Ec/Io)_i\right)$$

$$T_{ADD} = \max\left\{\min\left[\max_{i\in\{active\ set\}}\{i\,|\,(Ec/Io)_i\},T_{\text{ADD\_MultiSlope}}+\Delta\right],T_{\text{ADD\_95A}}\right\}$$

$$T_{DROP} =$$

$$\max\left\{A_{DROP}\left(\sum_{i\in\{remaining\ active\ set\}}(Ec/Io)_i\right)\times\sum_{i\in\{remaining\ active\ set\}}(Ec/Io)_i + B_{DROP}\left(\sum_{i\in\{remaining\ active\ set\}}(Ec/Io)_i\right), T_{\text{DROP\_95A}}\right\} \text{ for } T_{DROP} \text{ Second}$$

where Ec/Io is a measure of pilot signal strength, A is said slope of said corresponding line segment of said add threshold function, B is an intercept of said corresponding line segment of said add threshold function, $\Delta$ represents a hysteresis between $T_{\text{ADD\_Multislope}}$ and a new pilot signal strength Ec/Io, $A_{DROP}$ is said slope of said drop threshold function and $B_{DROP}$ is an intercept of said drop threshold function.

5. The multi-slope handoff method for controlling dynamic communication quality in wireless communications as claimed in claim 1, wherein said pilot strength is determined by means of different loads, a propagation method, or a fading channel.

6. The multi-slope handoff method for controlling dynamic communication quality in wireless communications as claimed in claim 1, wherein said each said line segment of said add threshold function has associated therewith an intercept, said intercept being modified responsive to different communication connection situations.

7. The multi-slope handoff method for controlling dynamic communication quality in wireless communications as claimed in claim 1, wherein said handoff operations further include:
  comparing pilot signal strength from a candidate pilot with said add connection trigger threshold and said drop connection trigger threshold to determine whether to add or drop, respectively, said candidate pilot to or from said set of pilots.

8. The multi-slope handoff method for controlling dynamic communication quality in wireless communications as claimed in claim 1, wherein said add connection trigger threshold and said drop connection trigger threshold are calculated using the same slope.

9. The multi-slope handoff method for controlling dynamic communication quality in wireless communications as claimed in claim 1, wherein said add connection trigger threshold and said drop connection trigger threshold are calculated using different slopes.

10. The multi-slope handoff method for controlling dynamic communication quality in wireless communications as claimed in claim 1, wherein said add connection trigger threshold is used to determine whether to add the pilot strength of said a nearby pilot.

11. The multi-slope handoff method for controlling dynamic communication quality in wireless communications as claimed in claim 10, wherein an add connection request is sent to said serving pilot if the pilot strength of said nearby pilot is larger than said add connection trigger threshold.

12. The multi-slope handoff method for controlling dynamic communication quality in wireless communications as claimed in claim 1, wherein said the drop connection trigger threshold is used to determine whether to drop the pilot strength of said service pilot.

13. The multi-slope handoff method for controlling dynamic communication quality in wireless communications as claimed in claim 12, wherein a drop connection request is sent to said servicing pilot if the pilot strength of said servicing pilot is smaller than said drop connection trigger threshold.

14. The multi-slope handoff method for controlling dynamic communication quality in wireless communications as claimed in claim 12, wherein a drop connection request is sent to said servicing pilot if the pilot strength of said servicing pilot has been smaller than said the drop connection trigger threshold for a preset period of time.

15. The multi-slope handoff method for controlling dynamic communication quality in wireless communications as claimed in claim 1, wherein a number of connection paths, a position of the mobile node, the pilot strength, and transmission power are calculated at every a period of time.

16. The multi-slope handoff method for controlling dynamic communication quality in wireless communications as claimed in claim 1, wherein a handoff status of said pilot is taken into account when performing selection of the pilot.

17. The multi-slope handoff method for controlling dynamic communication quality in wireless communications as claimed in claim 15, wherein if the pilot is not selected if a handoff frequency thereof is greater than a predetermined value.

18. The multi-slope handoff method for controlling dynamic communication quality in wireless communications as claimed in claim 1, wherein a signal strength of a newly-added pilot is above a predetermined quantity.

19. A multi-slope handoff method for controlling dynamic communication quality in wireless communications comprising the steps of:
  receiving at a mobile node pilot signals of a service pilot and nearby pilots to produce an aggregate strength agg Ec/Io;
  using services provided by said service pilot if said aggregate strength agg Ec/Io is greater than a set value; and
  performing handoff of pilot if said aggregate strength agg Ec/Io is lower than said set value, adjusting a slope A in a handoff operation function according to a communication connection situation using a communication connection quality parameter, wherein said handoff formula is used for setting of said add and drop connection trigger thresholds $T_{ADD}$ and $T_{DROP}$, respectively, of a pilot, and said handoff formula is as follows:

$$T_{\text{ADD\_MultiSlope}} =$$

$$A\left(\sum_{i\in\{active\ set\}}(Ec/Io)_i\right)\times\sum_{i\in\{active\ set\}}(Ec/Io)_i + B\left(\sum_{i\in\{active\ set\}}(Ec/Io)_i\right)$$

$$T_{ADD} = \max\{\min[\max\{i\,|\,(Ec/Io)_i\}, T_{\text{ADD\_MultiSlope}}+\Delta], T_{\text{ADD\_95A}}\}$$

$$T_{DROP} =$$

$$\max\left\{A_{DROP}\left(\sum_{i\in\{remaining\ active\ set\}}(Ec/Io)_i\right)\times\sum_{i\in\{remaining\ active\ set\}}(Ec/Io)_i + \right.$$

-continued $$B_{DROP}\left(\sum_{i\in\{remaining\,active\,set\}}(Ec/Io)_i, T_{\text{DROP\_95A}}\right) \text{ for } T_{TDROP} \text{ Second}$$

where B represents the intercept and Δ represents a hysteresis between $T_{ADD\text{-}MultiSlope}$ and a new pilot Ec/Io, thereby using said slope A and said aggregate strength agg Ec/Io for operation to calculate add and drop connection trigger thresholds $T_{ADD}$ and $T_{DROP}$ so as to select a pilot to be connected based on the communication connection quality at that time.

\* \* \* \* \*